US008553817B1

(12) United States Patent
Dinh et al.

(10) Patent No.: US 8,553,817 B1
(45) Date of Patent: Oct. 8, 2013

(54) METHOD AND APPARATUS FOR SHIPBOARD CO-SITE IN-BAND DESIRED SIGNAL EXTRACTION

(75) Inventors: Vincent V. Dinh, San Diego, CA (US); Daniel W. Tam, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 275 days.

(21) Appl. No.: 13/038,177

(22) Filed: Mar. 1, 2011

(51) Int. Cl.
*H03D 1/04* (2006.01)

(52) U.S. Cl.
USPC .......................................... 375/346; 375/285

(58) Field of Classification Search
USPC ................. 375/346, 285; 327/310, 384, 551; 348/607; 455/296
See application file for complete search history.

(56) References Cited

U.S. PATENT DOCUMENTS

| | | | |
|---|---|---|---|
| 3,696,429 A | 10/1972 | Tressa | |
| 4,093,923 A | 6/1978 | McCormick | |
| 4,135,159 A | 1/1979 | Kubanoff | |
| 4,870,424 A | 9/1989 | Lalezari et al. | |
| 5,966,684 A | 10/1999 | Richardson et al. | |
| 6,167,275 A * | 12/2000 | Oros et al. | 455/456.2 |
| 6,693,971 B1 | 2/2004 | Kowalski | |
| 7,277,725 B1 * | 10/2007 | Henry et al. | 455/553.1 |
| 8,301,104 B1 * | 10/2012 | Gupta et al. | 455/296 |
| 2005/0095985 A1 * | 5/2005 | Hafeoz | 455/67.11 |
| 2008/0026689 A1 | 1/2008 | Johnson et al. | |
| 2010/0158075 A1 * | 6/2010 | Deisher et al. | 375/130 |
| 2010/0323652 A1 * | 12/2010 | Visser et al. | 455/232.1 |
| 2012/0100809 A1 * | 4/2012 | Lackey | 455/63.1 |

* cited by examiner

*Primary Examiner* — Shuwang Liu
*Assistant Examiner* — Helene Tayong
(74) *Attorney, Agent, or Firm* — Kyle Eppele; J. Eric Anderson (57) ABSTRACT

Systems and methods are disclosed for removing interference in a time-harmonic received composite signal, comprising, sampling an in-band interfering signal from a stationary transmitter at a stationary receiver; sampling a composite signal having the in-band interfering signal and an in-band desired signal from a stationary transmitter at the receiver, deriving at least one of a phase and time difference from the composite signal and sampled in-band interfering signal, applying the derived at least one of phase and time difference to the sampled in-band interfering signal to estimate a synchronized current in-band interfering signal, and generating the un-interfered, in-band desired signal by subtracting the synchronized current in-band interfering signal from a current composite signal.

6 Claims, 7 Drawing Sheets

METHOD AND APPARATUS FOR SHIPBOARD CO-SITE IN-BAND DESIRED SIGNAL EXTRACTION

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil. Reference Navy Case No. 100,421.

FIELD

This disclosure relates generally to radio frequency reception/transmission antenna systems capable of selectively discriminating between spatially displaced locations of wanted and unwanted signal reception/transmissions.

BACKGROUND

When two signals are on different frequencies, they can be separated by simple filtering methods. But when the two signals are on the same frequency, they will combine into one (composite) signal having the same frequency. Filtering out one signal will inadvertently filter out the other signal. So separating the two signals using filters is not a viable option. The only known solution is to add to the composite signal a negative of the signal that is desired to be removed. In essence, this is called cancellation via subtraction. U.S. Pat. Nos. 3,696,429; 4,093,923; 4,135,159; 5,966,684; and 4,870,424 describe classic approaches to filtering "unwanted" signals. However, these examples are only effective when the amplitude and particularly the phase (timing) of the interferer is known. In some situations, these requirements cannot be met.

Accordingly, there has been a long-standing need for new systems and methods for co-site, in-band signal extraction and/or recovery, as further described in detail below.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a method of removing interference in a time-harmonic received composite signal is provided, comprising: sampling an in-band interfering signal from a stationary transmitter at a stationary receiver; sampling a composite signal having the in-band interfering signal and an in-band desired signal from another stationary transmitter at the receiver; deriving at least one of a phase and time difference from the composite signal and sampled in-band interfering signal; applying the derived at least one of phase and time difference to the sampled in-band interfering signal to estimate a synchronized current in-band interfering signal; and generating the un-interfered, in-band desired signal by subtracting the synchronized current in-band interfering signal from a current composite signal.

In one aspect of the disclosed embodiments, a time-harmonic in-band signal interference removing system is provided, comprising: an in-band interfering signal from a stationary transmitter; an in-band desired signal from another stationary transmitter; a stationary receiver receiving the in-band interfering signal and in-band desired signal; an in-band interfering signal removal module, wherein the removal module derives at least one of a phase and time difference from a composite signal formed from a sampled in-band interfering signal and sampled in-band desired signal, applies the derived at least one of phase and time difference to the sampled in-band interfering signal to estimate a synchronized current in-band interfering signal, and generates an un-interfered in-band desired signal by subtracting the synchronized current in-band interfering signal from a current composite signal.

In another aspect of the disclosed embodiments, a system of removing interference in a time-harmonic received composite signal is provided, comprising: means for sampling an in-band interfering signal from a stationary transmitter at a stationary receiver; means for sampling a composite signal having the in-band interfering signal and an in-band desired signal from another stationary transmitter at the receiver; means for deriving at least one of a phase and time difference from the composite signal and sampled in-band interfering signal; means for applying the derived at least one of phase and time difference to the sampled in-band interfering signal to estimate a synchronized current in-band interfering signal; and means for generating the un-interfered, in-band desired signal by subtracting the synchronized current in-band interfering signal from a current composite signal.

DETAILED DESCRIPTION

The following description details a wireless implementation to extract a desired signal from co-site in-band interference. It should be appreciated that the desired signal can be weaker in strength than the interfering signal. The interfering signal can be a periodic signal, either pulsed or continuous wave (CW). Aspects of the disclosed embodiments are useful in constrained environments where the interferer(s) are located within a known distance from the receiving antenna and are in a steady state operating mode. As one example, the distance between transmitters on a ship or mobile platform is well known, being fixed on the platform. The "fixed" transmitter for an interfering signal provides the property that its recorded version has the same Fourier properties for the time under consideration. With this consideration, aspects of the described embodiments may be implemented on various mobile platforms without departing from the spirit and scope herein.

Figure 1:
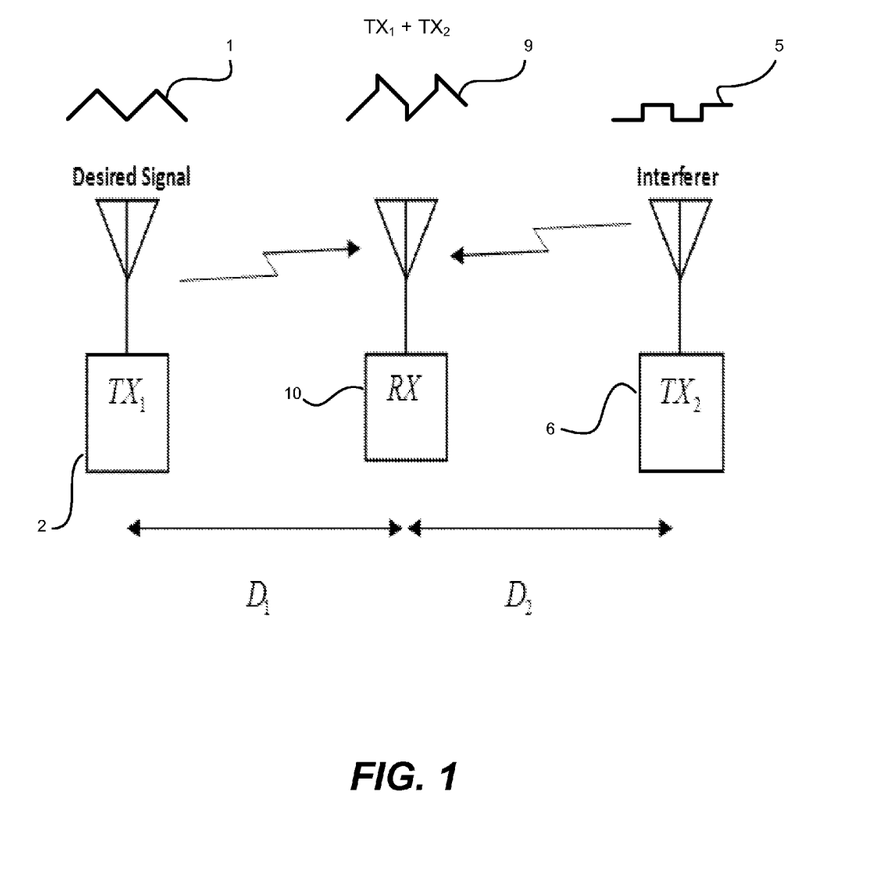
FIG. 1 is an illustration of a multi-transmitter/receiver co-site arrangement.

FIG. 1 is an illustration of a multi-transmitter/receiver co-site arrangement suitable for application of the exemplary methods and systems described herein. The desired signal 1 emanating from transmitter/antenna $TX_1$ 2 is combined with an interfering signal 5 emanating from interfering transmitter/antenna $TX_2$ 6, to result in the composite signal 9 which is received by receiver/antenna RX 10. It is understood that in this non-limiting exemplary scenario the distances between the desired signal transmitter/antenna $TX_1$ 2 and interfering signal transmitter/antenna $TX_2$ 6 from the receiver/antenna RX 10 are known, shown in FIG. 1 by distances $D_1$ and $D_2$, respectively.

Figure 2:
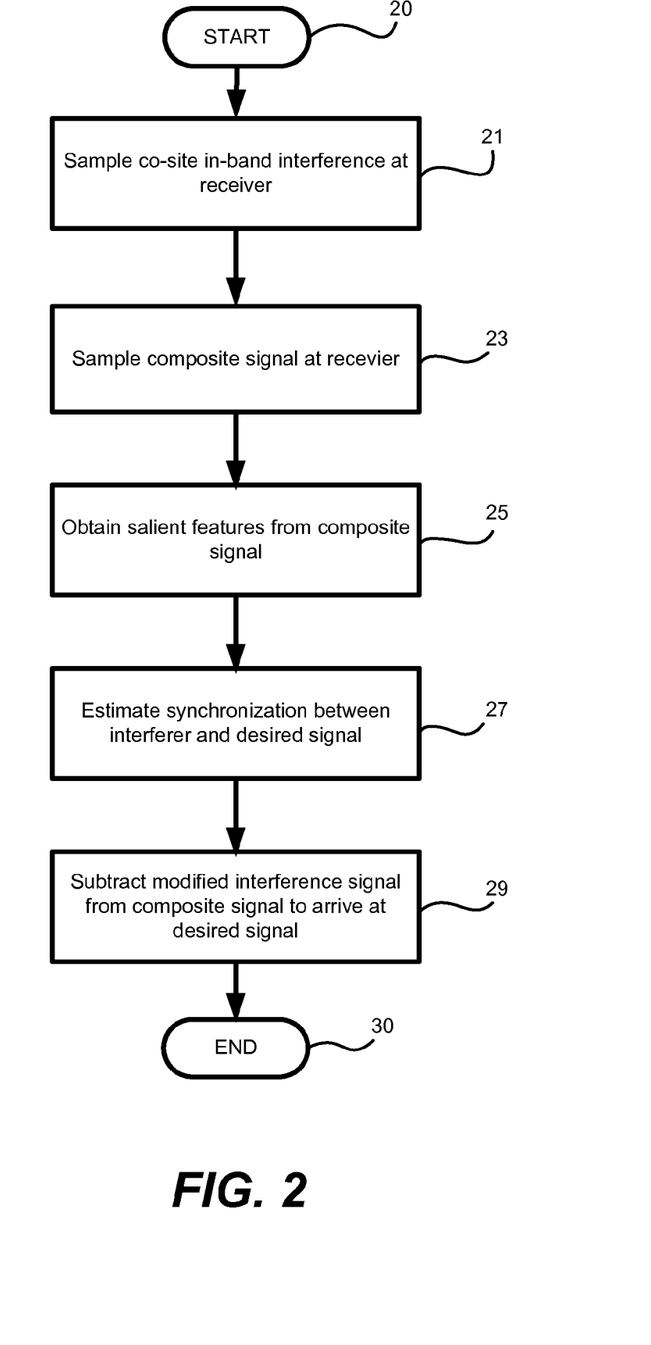
FIG. 2 is a flow chart diagram summarizing an exemplary approach for extracting the desired signal from the composite signal.

FIG. 2 is a flow chart diagram summarizing a non-limiting exemplary approach for extracting the desired signal from the composite signal. The exemplary approach starts 20 with sampling 21 only the co-site in-band interferer signal at the receiver. This sampled data is stored for later use. Next the composite signal at the receiver is sampled 23 and also stored for later use. Note, between steps 21 and 23, no time relationship is assumed between the capture events. Also no time relationship is assumed between the interfering signal and the desired signal. From the above, the exemplary approach then obtains 25 the salient features (time relationships) from the composite signal by modifying/aligning or synching the recorded interference signal 21 up with the composite signal. One of several approaches to accomplish this is to estimate the phase difference between the current composite signal (on-the-fly, so to speak) and the recorded interference signal 21. This can be achieved by recognizing that the phase difference (phase_diff) between the two signals is approximately equal to difference of the current composite signal's Fourier-transform phase and that of the recorded interference signal. That is, phase_diff~phase(FFT (composite))−phase (FFT(recorded interference)). Other approaches within the scope of one of ordinary skill in the art may be used.

Next, an estimation 27 of the synchronization between the interference signal and desired signal is performed. This can be obtained by recognizing that the above-obtained phase_diff can be converted to a time value according to: time latency (t_lat)=phase_diff/(2*π). This time latency (t_lat) is applied to the recorded interference signal to result in a modified interference=recorded interference (t−t_lat), where t represents time. The modified interference represents a very good approximation of the actual interfering signal, accounting for time delay. The exemplary approach then subtracts 29 the interference signal with the correct time relationship (i.e., modified interference) from the composite signal to extract the desired signal. The exemplary process then stops 30.

To demonstrate the efficacy of the above exemplary approach, an experimental model was built using three (3) antennas configured with signal generators coupled to two antennas (transmit antennas) and an oscilloscope receiver coupled to the third antenna (receive antenna) in the arrangement depicted in FIG. 1. Both the desired signal generator and interfering signal generator were configured to beam continuous waves at the oscilloscope receiver. The interfering signal's power level was set at least 10 times larger than that of the desired signal's power. To simulate in-band interference, both generators' frequencies were set at f~350 MHz. All antennas used in the experimental setup were ¼ wave monopole antennas of length L~8.75" and also terminated with 50Ω. Of course, other types of antennas as well as frequencies may be used according to design preference.

For associating the above signal generators/oscilloscope receiver and antennas in the context of the framework of FIG. 1, the corresponding elements will be used in the following explanation. That is, the interfering signal generator and antenna combination will correspond to interfering transmitter/antenna $TX_2$ 6 of FIG. 1 and the desired signal generator and antenna combination will correspond to desired signal transmitter/antenna $TX_1$ 2 of FIG. 1 Similarly, the oscilloscope receiver and receive antenna will correspond to receiver/antenna RX 10 of FIG. 1.

Applying now the steps show in FIG. 2, first, in order to establish a reference, the interfering signal 5 is received from the receiver/antenna RX 10 while the interfering transmitter/antenna $TX_2$ 6 is transmitting with the desired signal transmitter/antenna $TX_1$ 2 not transmitting. This establishes a baseline representation of the interfering signal 5 at the receiver/antenna RX 10. This is performed understanding that the interfering transmitter/antenna $TX_2$ 6 is displaced from the receiver/antenna RX 10 by an arbitrarily fixed distance $D_i$=6.5".

Next, the composite signal 9 from the receiver/antenna RX 10 is captured (or sampled) while the interfering transmitter/antenna $TX_2$ 6 and the desired signal transmitter/antenna $TX_1$ 2 are both transmitting. This is accomplished with an understanding that the respective transmitter-to-receiver/antenna distance is arbitrarily fixed at $D_i$=6.5". Non-similar distances may be used, according to design. By applying steps 25-29 of FIG. 2, the desired signal 1 is obtained by subtracting the modified interference signal from the composite signal 9. It should be noted that the exemplary approach described herein does not rely on a known capture time for either the composite signal or interference signal. The Applicants believe this to be one of several aspects of the disclosed subject matter that is unique to the art. That is, timing of the capture events is not necessary to arrive at the desired results.

Figure 3:
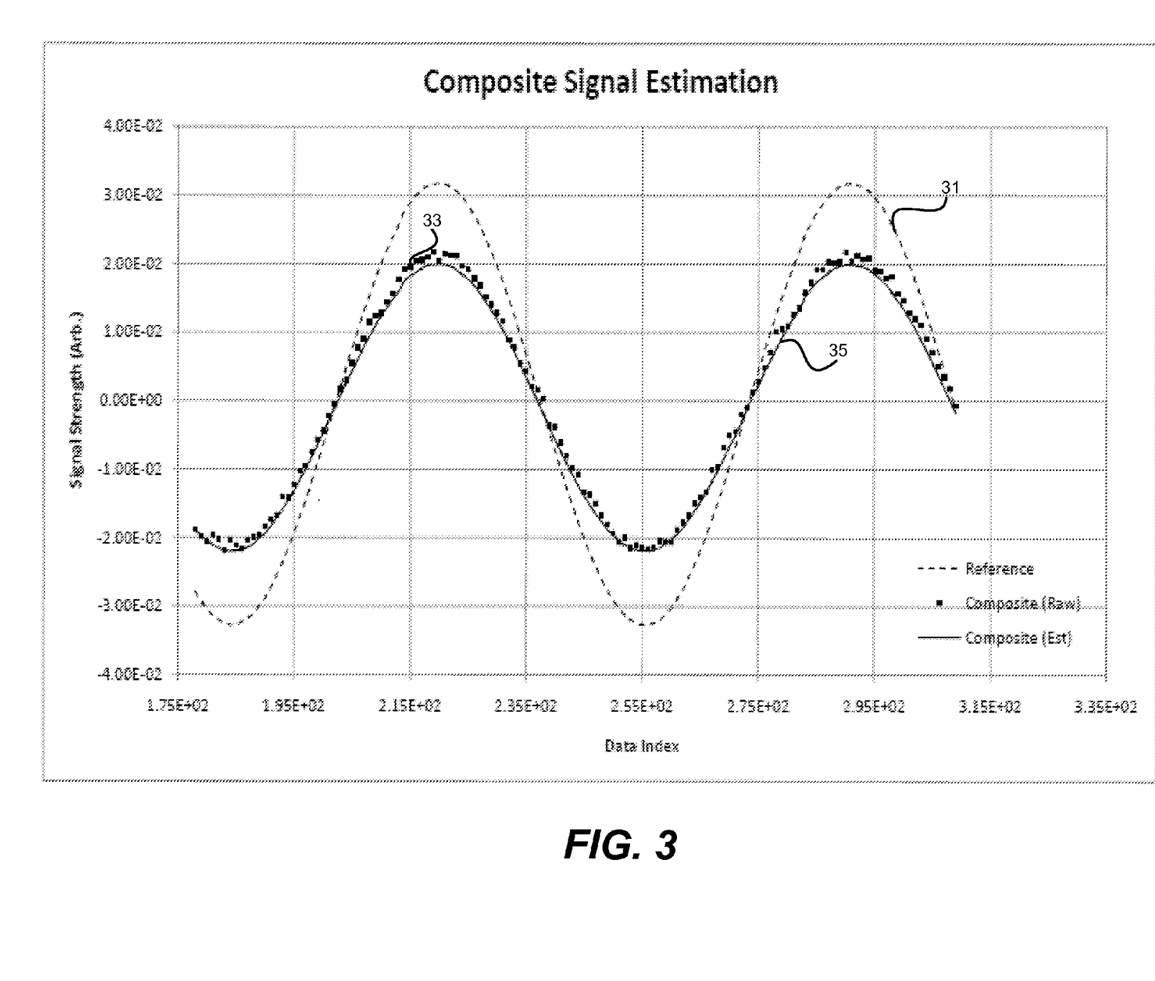
FIG. 3 is a plot showing results of an experimental model operating at f=350 MHz.
Figure 4:
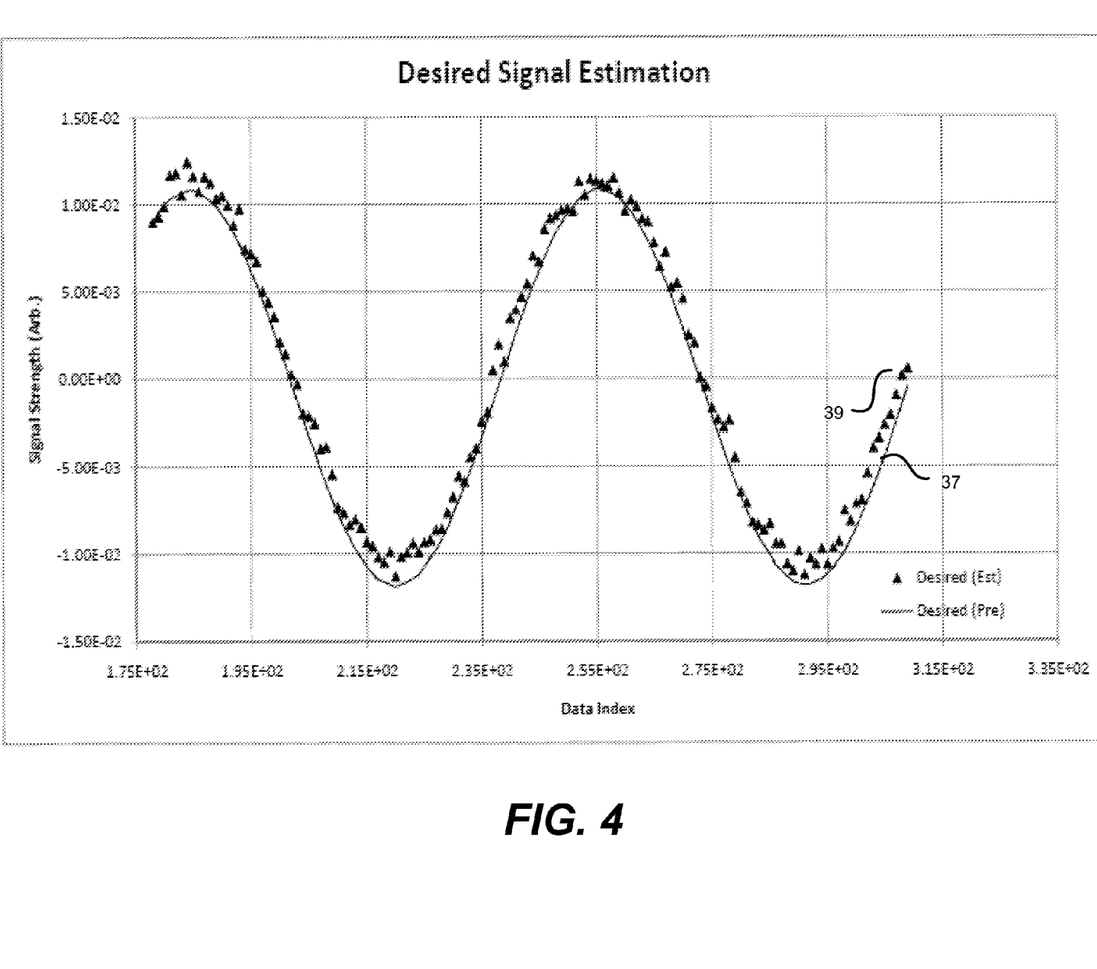
FIG. 4 is a followup plot comparing results of the experimental model of FIG. 3.

FIGS. 3-4 are plots showing the results of an experimental model operating at 350 MHz using measurement equipment that is standard to the art. The ordinate's scale represents a normalized relative value and the abscissa's scale is a data index which corresponds to a time scale. Referring to FIG. 3, Line 31 represents the reference interference signal having a power of approximately 10 dBm. Line 33 represents the raw or actual composite signal from the combination of the interference signal 31 and desired signal 37 (as shown in FIG. 4). Line 35 is a plot of the estimated or expected composite signal that is obtained using the method/approaches described above.

Referring to FIG. 4, a comparison of the extracted or estimated desired signal to the actual signal is shown. Specifically, pre-recorded or original desired signal line 37 is recognized as having a lower power lever (0.1 dBm) and is shifted from the reference/interference signal (line 31 of FIG. 3). The extracted or estimated desired signal is line 39 which compares very favorably with the actual desired signal 37. Again it is noted that only the interference signal (line 31) and composite signal (line 33) of FIG. 3 are known. All the other signal lines (with the exception of the actual desired signal—line 37, used for comparison purposes) are derived. By using the exemplary procedures described above, it has been shown that by utilizing the interference signal (line 31) and composite signal (line 35) only, an extracted desired signal (line 39) can be generated which is seen to compare favorably to the actual desired signal (line 37).

Figure 5:
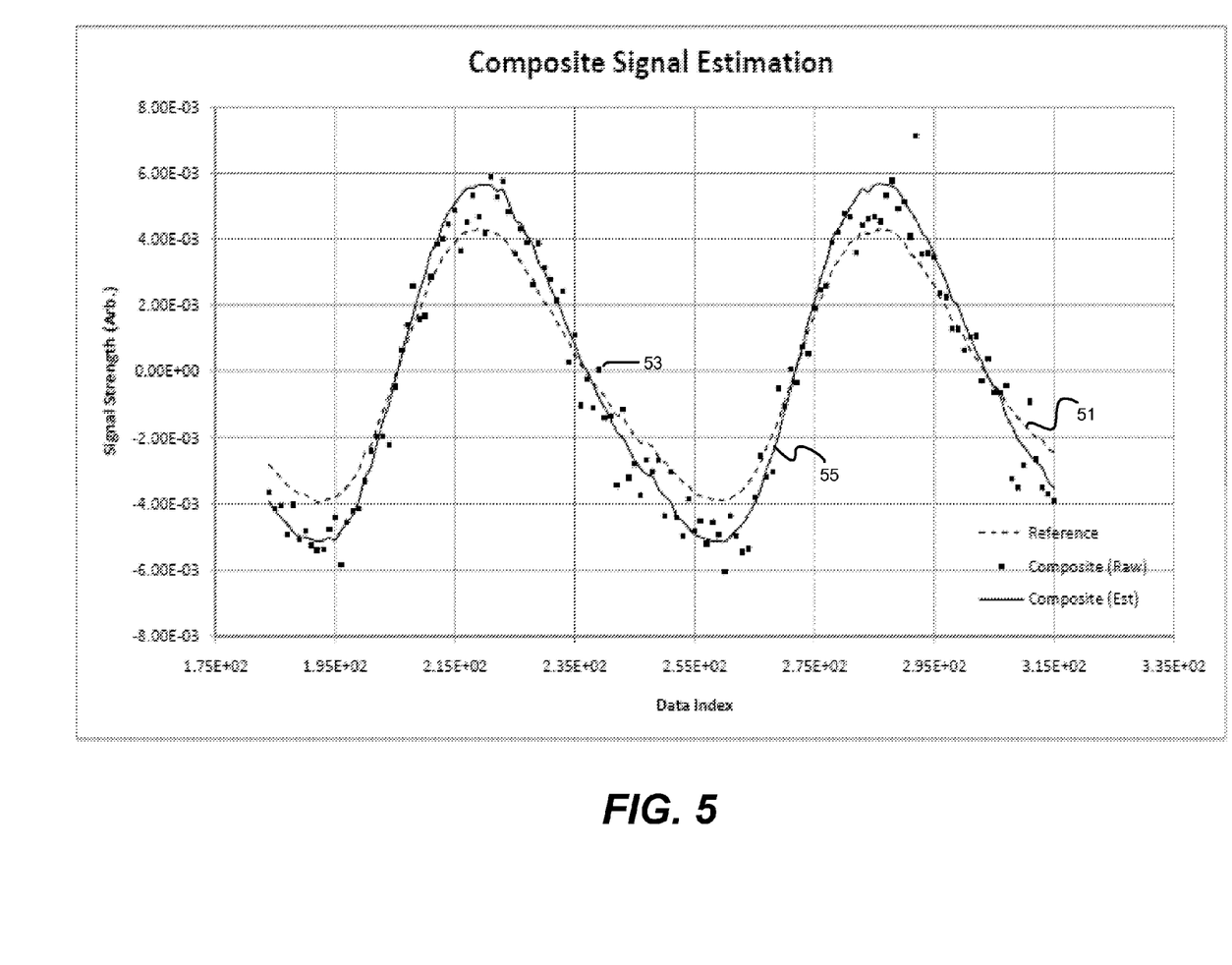
FIG. 5 is another plot showing results of an experimental model operating at a frequency of f=150 MHz.
Figure 6:
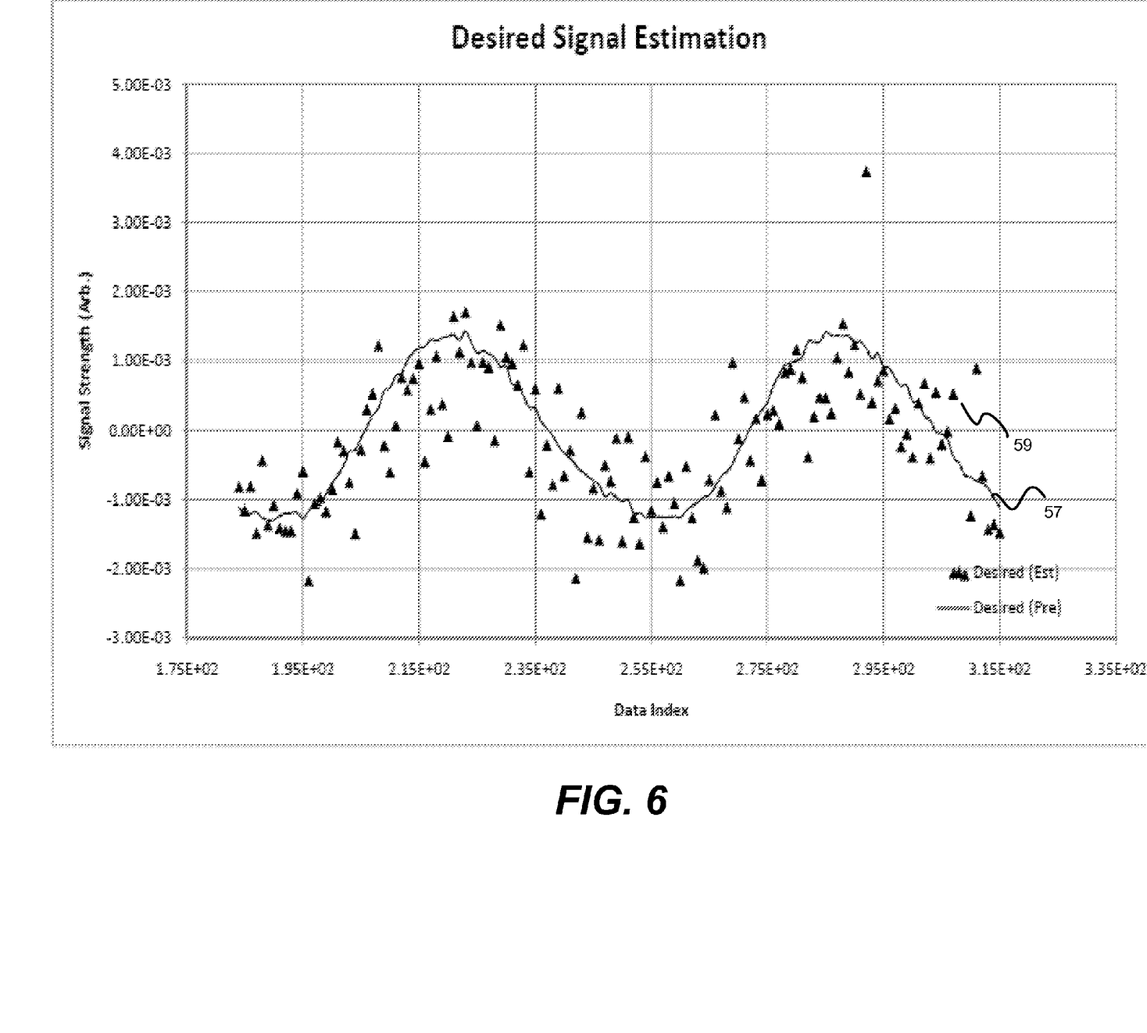
FIG. 6 is followup plot comparing results of the experimental model of FIG. 5.

FIGS. 5-6 are plots showing the results of the experimental model operating at 150 MHz using measurement equipment that is standard to the art. The ordinate's scale represents a normalized relative value and the abscissa's scale is a data index which corresponds to a time scale. Referring to FIG. 5, line 51 represents the reference interference signal, line 53 represents the raw or actual composite signal from the combination of the interference signal 51 and desired signal 57 (as shown in FIG. 6). Line 55 is a plot of the estimated or expected composite signal that is obtained using the method/approaches described above.

Referring to FIG. 6, a comparison of the extracted or estimated desired signal against the actual signal is shown. Specifically, pre-recorded or original desired signal line 57 is recognized as having a lower power lever (0.1 dBm) and is shifted from the reference/interference signal (line 51 of FIG. 5). The extracted or estimated desired signal is line 59 which compares very favorably with the actual desired signal 57. Again it is noted that only the interference signal (line 51) and composite signal (line 53) of FIG. 5 are known. All the other signal lines (with the exception of the actual desired signal—line 57, used for comparison purposes) are derived. By using the exemplary procedures described above, it has been shown that by utilizing the interference signal (line 51) and composite signal (line 55) only, an extracted desired signal (line 59) can be generated which is seen to compare favorably to the actual desired signal (line 57).

It should be noted that it is evident that the composite signal (line 53) is due to antenna mismatch loss at the operating frequency of f=150 MHz being much higher than that at f=350 MHz. This mismatch loss is apparent when examining the antenna VSWRs.

Figure 7:
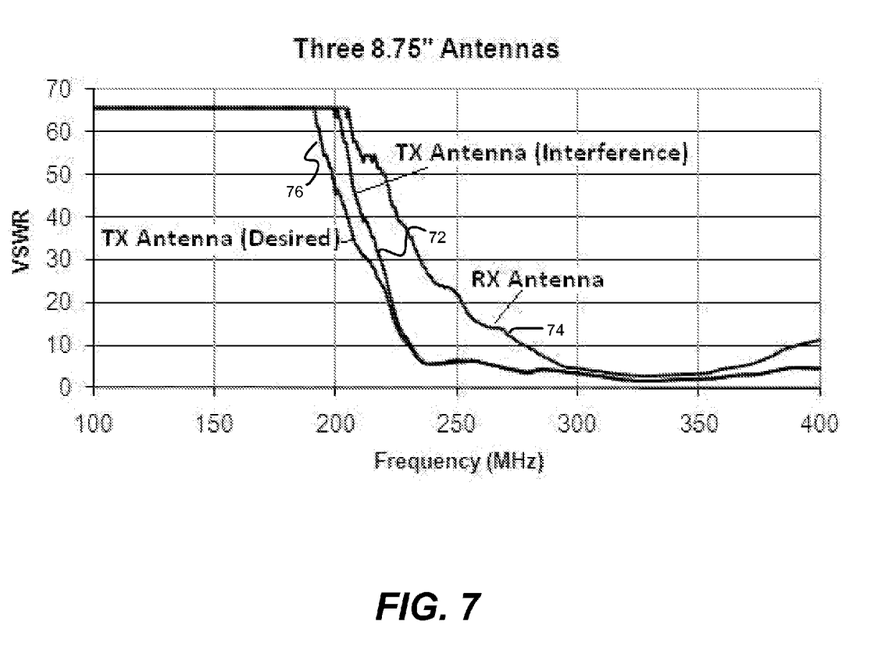
FIG. 7 is a plot of measured VSWRs for experimental model antennas spanning different frequencies.

FIG. 7 is a plot of measured VSWRs for the antennas described above at different frequencies. The VSWR response for interfering antenna is shown as line 72, for receiving antenna is line 74, and for desired signal antenna as line 76. Examining this plot shows that at f=150 MHz, a VSWR of ~65:1 corresponds to a 12.24 dB mismatch loss; whereas at f=350 MHz, a VSWR of ~2.5:1 corresponds to a mismatch loss of 0.88 dB. Accordingly, the dimensions of the experimental model are shown to be sensitive to lower frequencies and is better suited for f>280 MHz or higher. While the experimental model may have limitations, it is expressly understood that the exemplary principles articulated herein are not frequency limited and may be applied to frequencies below or beyond those that have been demonstrated here.

The above exemplary embodiments show that co-site interference can be easily extracted from a receiver using an elegant approach that does not require timing information; and can be applied to any form of time-harmonic signal that is measurable, whether in the form of time radio waves or non-radio waves. For example, sound waves or other time-harmonic functions can be applied without departing from the spirit and scope herein. In view of the described approaches, it is possible to tolerate or accommodate interfering signals without degrading reception of the intended or desired signal. Concomitantly, co-site radiators can be designed with less stringent radiation patterns (for example, lobes) due to the ability to "remove" their interference from the received composite signal.

In view of this, it should be appreciated that the above exemplary embodiments may be applied to ships, airplanes, buildings, vehicles and so forth, that utilize antennas that experience co-site or near co-site interference. Additionally, software running on a processor may be devised to implement the various methods and/or steps elucidated above.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and processes described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. In the alternative, the processor and the storage medium may reside as discrete components.

It will be understood that many additional changes in the details, materials, steps and arrangement of parts, which have been herein described and illustrated to explain the nature of the invention, may be made by those skilled in the art within the principal and scope of the invention as expressed in the appended claims.

What is claimed is:

1. A method of removing interference signals without the use of band pass filtering, in a time-harmonic composite signal processed by a receiver that is stationary with respect to at least one co-site transmitter, comprising:

momentarily inhibiting transmission of the desired signal;
   sampling an in-band interfering signal from the at least one co-site stationary transmitters by the co-site stationary receiver;
   storing the value of the in-band interfering signal;
   transmitting the desired signal from the desired transmitter;
   sampling the time-harmonic composite signal having the in-band interfering signal and the in-band desired signal by the co-site stationary receiver;
   deriving a phase difference from the composite signal and the sampled in-band interfering signal based on a relationship between the two signals defined as the phase difference between the composite signal and the sampled in-band signal is approximately equal to the difference of a Fourier-transform phase value of each signal;
   applying the derived phase difference value to the sampled in-band interfering signal to estimate a synchronized current in-band interfering signal by utilizing a time latency value determined by dividing the derived phase difference value by a sum of two times pi ($\pi$), wherein $\pi$ is equal to 3.14; and generating an un-interfered, in-band desired signal by subtracting the synchronized current in-band interfering signal value from a current composite signal.

2. The method of claim 1, wherein the Fourier transform is a Fast Fourier Transform.

3. The method of claim 1, wherein the stationary co-site transmitters and stationary co-site receiver are on a mobile platform.

4. The method of claim 1, wherein the time-harmonic signal is a radio signal.

5. The method of claim 1, wherein the time-harmonic signal is an acoustic signal.

6. A system of removing interference in a time-harmonic received composite signal, comprising:

means for sampling only an in-band interfering signal from at least one transmitter by a receiver that is stationary with respect to the at least one transmitter;

means for sampling the time-harmonic received composite signal having an in-band interfering signal and an in-band desired signal;

means for deriving a time difference value from the composite signal and the sampled in-band interfering signal based on a relationship between the two signals defined as the phase difference between the composite signal and the sampled in-band signal is approximately equal to the difference of a Fourier-transform phase value of each signal;

means for applying the derived time difference value to the sampled in-band interfering signal to estimate a synchronized current in-band interfering signal by utilizing a time latency value determined by dividing the derived phase difference value by a sum of two times pi($\pi$), wherein $\pi$ is equal to 3.14; and means for generating an un-interfered, in-band desired signal by subtracting the synchronized current in-band interfering signal value from a current composite signal.

* * * * *